United States Patent
Ghosh et al.

(10) Patent No.: US 6,721,765 B2
(45) Date of Patent: Apr. 13, 2004

(54) DATABASE SYSTEM WITH IMPROVED METHODS FOR ASYNCHRONOUS LOGGING OF TRANSACTIONS

(75) Inventors: Prasanta Ghosh, San Ramon, CA (US); Vadiraja Bhatt, Alameda, CA (US); Girish Vaitheeswaran, Fremont, CA (US)

(73) Assignee: Sybase, Inc., Dublin, CA (US)

( * ) Notice: Subject to any disclaimer, the term of this patent is extended or adjusted under 35 U.S.C. 154(b) by 48 days.

(21) Appl. No.: 10/190,401

(22) Filed: Jul. 2, 2002

(65) Prior Publication Data

US 2004/0010499 A1 Jan. 15, 2004

(51) Int. Cl.⁷ .............................. G06F 17/30
(52) U.S. Cl. ....................... 707/202; 707/102
(58) Field of Search ............... 707/1, 2, 3, 4, 707/5, 6, 7, 8, 9, 10, 100, 101, 102, 103, 201, 202, 203; 714/15

(56) References Cited

U.S. PATENT DOCUMENTS

| | | | |
|---|---|---|---|
| 5,778,388 A | * | 7/1998 | Kawamura et al. ......... 707/203 |
| 6,014,674 A | * | 1/2000 | McCargar .................... 707/202 |
| 6,275,832 B1 | * | 8/2001 | Watts et al. ................. 707/203 |
| 6,496,944 B1 | * | 12/2002 | Hsiao et al. .................. 714/15 |
| 6,567,928 B1 | * | 5/2003 | Lyle et al. .................... 714/15 |

* cited by examiner

*Primary Examiner*—Diane D. Mizrahi
*Assistant Examiner*—Yicun Wu
(74) *Attorney, Agent, or Firm*—John A. Smart; G. Maok Riddle

(57) ABSTRACT

A database system providing improved methods for asynchronous logging of transactions is described. Log records are created describing changes to a database made by a transaction. When a command committing changes to the database for the transaction is received, a logging request is placed in a queue. An asynchronous logging service removes requests from the queue and transfers log records from the transaction to a shared cache. The shared cache stores log records before they are written to the transaction log. The logging service writes log pages containing log records for the transaction from the cache to the transaction log. After all log pages in the cache for the transaction have been written to the transaction log, changes to the database made by the transaction can be committed to the database.

54 Claims, 9 Drawing Sheets

DATABASE SYSTEM WITH IMPROVED METHODS FOR ASYNCHRONOUS LOGGING OF TRANSACTIONS

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to information processing environments and, more particularly, to improved methods for logging of transactions which are posted in a data processing system, such as a database management system (DBMS).

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level.

DBMS systems have long since moved from a centralized mainframe environment to a de-centralized or distributed environment. Today, one generally finds database systems implemented as one or more PC "client" systems, for instance, connected via a network to one or more server-based database systems (SQL database server). Commercial examples of these "client/server" systems include Powersoft® clients connected to one or more Sybase® Adaptive Server® Enterprise database servers. Both Powersoft® and Sybase® Adaptive Server® Enterprise (formerly Sybase® SQL Server®) are available from Sybase, Inc. of Dublin, Calif. The general construction and operation of database management systems, including "client/server" relational database systems, is well known in the art. See e.g., Date, C., "An Introduction to Database Systems, Volume I and II," Addison Wesley, 1990; the disclosure of which is hereby incorporated by reference.

Traditionally, database management systems (e.g., the above-described client/server database systems) have been employed for on-line transaction processing (OLTP) involving the posting of data from "transactions" to a database table. As part of this process, OLTP systems typically employ a logging system to log changes which occur to the system. In a commercial embodiment such as Sybase Adaptive Server Enterprise, this is done by copying log records to a transaction log. Every transactional operation, including inserts, updates, and deletes, causes a log record to be written to the transaction log or simply "log." Each particular log record characterizes the change which has occurred to the database during processing of a transaction. This information can be used, for instance, in error recovery, to restore the database to a preexisting, consistent state.

Consider a scenario where a transaction performs updates to a table but then the transaction "rolls back"—that is, aborts. In such a case, the system will undo the updates by reading backwards from the log and reversing the changes which were made (as a result of the updates). The recovery system of databases, therefore, employs the logging system and log records when performing the work of rolling back a transaction. In a similar fashion, the log can be used in the face of a failure, such as when a machine "crashes." As the log is read during recovery, some transactions are re-done on the one hand, while incomplete transactions are undone on the other. In addition to rolling back transactions and supporting error recovery, the log also provides an archive for the database, which documents the specific actions which have led to the current state of the database. All told, the log plays a critical part in the design and implementation of present-day relational database systems.

The logging system itself permits reading from and writing to the log. Write access is typically performed by "access methods" within a relational database system (i.e., a database system which presents data as tables or "relations"). In particular, these methods generate log records which describe actions occurring which affect the database. Read access, on the other hand, is generally provided by a recovery system within the database. In general, therefore, a database system includes systems for writing log records into the log and, if needed, reading back those records.

A general description of the design and implementation of a logging system in a relational database is provided by Gray, J. and Reuter, A., "Transaction Processing: Concepts and Techniques," Morgan Kaufmann Publishers, 1993, the disclosure of which is hereby incorporated by reference. For an overview of relational database systems, see the above-mentioned "An Introduction to Database Systems," the disclosure of which has been previously incorporated by reference.

Each day more and more businesses are run from mission-critical systems which store information on server-based database systems, such as Sybase Adaptive Server Enterprise. As a result, increasingly higher demands are being placed on server-based database management systems to "scale" with increased hardware resources—that is, as more sophisticated hardware (e.g., multi-processor units) becomes available, these systems should provide greater throughput.

The logging system of a database system presents a bottleneck to system scalability, however. This is because every insert, update, and delete operation must make a log entry to protect the database from corruption if a system failure or transaction rollback occurs. Most relational databases process a log entry for each update, insert, or delete statement, and each log entry is processed one at a time. When a log entry is written, the logging system must navigate through a synchronization point referred to as the "log semaphore" which controls concurrent access to the log by multiple database transactions. Because every transaction involves the logging system, its efficiency is paramount to transaction throughput. As scalability increases in a database system and transaction volume increases, the contention for logging resources dramatically increases, resulting in reduced system throughput.

One way for reducing contention for logging resources in a transaction processing system is to provide a private log cache which provides an area of memory where log records relating to a user's task are built and stored before being posted to the log. Each private log cache may hold multiple log records for a transaction. The private log cache is only written to the log when a transaction commits or when memory fills with log records, thereby reducing steady state contention on the logging system. For further description of a database server system having a private log cache see commonly-owned U.S. Pat. No. 6,321,234, "Database Server System with Improved Methods for Logging Transactions." The disclosure of the foregoing is hereby incorporated by reference for all purposes.

Although use of a private logging cache reduces steady state contention on logging resources, several problems remain in logging systems of current database management systems that impact performance (e.g., throughput) of such systems. A number of the logging operations of current database management systems involve sequential operations against the logging system of the database system. As such, a large bottleneck may be created; particularly in the context of large OLTP systems as multiple transactions seek to access shared logging resources at the same time.

Other factors are adding to the demands that are being placed on logging systems of databases. Applications have become more complex with multi-tier systems consolidating various parts of an enterprise system and generating increased load and traffic on the underlying database systems. In addition, users of these systems are increasing upgrading the support hardware to machines with multiple processors capable of performing millions of transactions. This increased number of processors presents a new set of challenges for database systems. An increased number of processors (CPUs) increases contention on some of the key system resources, such as logging resources.

What is needed is a solution which preserves database throughput by reducing the contention which occurs for logging resources, even when a database system is handling hundreds or thousands of transactions per minute. The present invention fulfills this and other needs.

GLOSSARY

The following definitions are offered for purposes of illustration, not limitation, in order to assist with understanding the discussion that follows.

OLTP or Transaction Processing: A transaction processing or OLTP system is a type of computer processing system in which the system responds immediately to user requests. Each user request is considered to be a transaction. Automatic teller machines for banks are one example of a transaction processing system. Transaction processing involves interaction with a user, whereas batch processing can take place without a user being present.

Spin lock: A spin lock is a multi-processor synchronization mechanism. As is known in the art, a spin lock is a synchronization mechanism, such as a mutex (mutually-exclusive access), except that with a spin lock the process or thread does not "sleep" on the lock. Instead, it "spins"—continues to execute waiting for the lock to be lifted. By spinning instead of sleeping, the process avoids the overhead and cost of a context switch. Most often, spin locks are employed for access to critical resources.

SQL: SQL stands for Structured Query Language, which has become the standard for relational database access, see e.g., "Information Technology—Database languages—SQL," published by the American National Standards Institute as American National Standard ANSI/ISO/IEC 9075: 1992, the disclosure of which is hereby incorporated by reference. For additional information regarding SQL in database systems, see e.g., Date, C., "An Introduction to Database Systems, Volume I and II," Addison Wesley, 1990, the disclosure of which is hereby incorporated by reference.

Task: A task refers to the combination of a program or application being executed and related booking information used by the system. Whenever a particular program or application is executed, a task is created which serves as an envelope for the program. The task identifies the program with a task number and attaches other bookkeeping information to it. Many systems, including database systems, are capable of performing many tasks at the same time and are called multi-tasking systems. The terms task and process are sometimes used interchangeably, although some systems make a distinction between the two.

Thread: A thread refers to a part of a program that can execute independently of other parts. Operating systems that support multi-threading enable programmers to design programs whose threaded parts can execute concurrently. In some systems, there is a one-to-one relationship between the task and the program, but a multi-threaded system allows a program to be divided into multiple tasks. Multi-threaded programs may have several threads running through different code paths simultaneously.

SUMMARY OF THE INVENTION

The asynchronous logging system of the present invention provides improved methods for storing log records in a manner that reduces contention for logging resources of a database system. Log records are created describing changes to the database for a given transaction. When a command which commits changes to the database for a transaction is received, a request to store log records for the transaction is automatically placed in a request queue. Requests are removed from the request queue in sequence and log records from the transaction associated with the request are transferred to a shared cache. The shared cache contains log pages for storing log records from multiple transactions before such log records are written to the transaction log. After log records for the transaction are transferred to log pages in the shared cache, the log pages are written from the shared cache to the transaction log. After all log pages in the shared cache for a given transaction have been written to the transaction log, changes to the database made by the transaction can be committed to the database.

The asynchronous logging system of the present invention includes three modules or threads. A log allocation module or thread monitors unwritten log pages available in the shared cache and allocates additional log pages to the shared cache when it determines that additional log pages are required. A flusher module or thread receives requests for storing log records for transactions from a plurality of transactions. The flusher module handles each of these requests on behalf of a given transaction by transferring log records for the transaction to the shared cache. A log writer module or thread monitors log pages in the shared cache which contain log records. When the log writer module finds log pages containing log records in the shared cache, it writes these log pages to the transaction log. The log writer notifies the applicable client or transaction after all log records for a transaction have been written to the transaction log.

DETAILED DESCRIPTION OF A PREFERRED EMBODIMENT

The following description will focus on the presently preferred embodiment of the present invention, which is implemented in a network environment in which an application running under a desktop operating system, such as the Microsoft® Windows operating system running on an IBM-compatible PC executes transactions against a database server running a server operating system such as UNIX or Solaris. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-based Implementation

A. Basic System Hardware (e.g., for Desktop and Server Computers)

Figure 1:
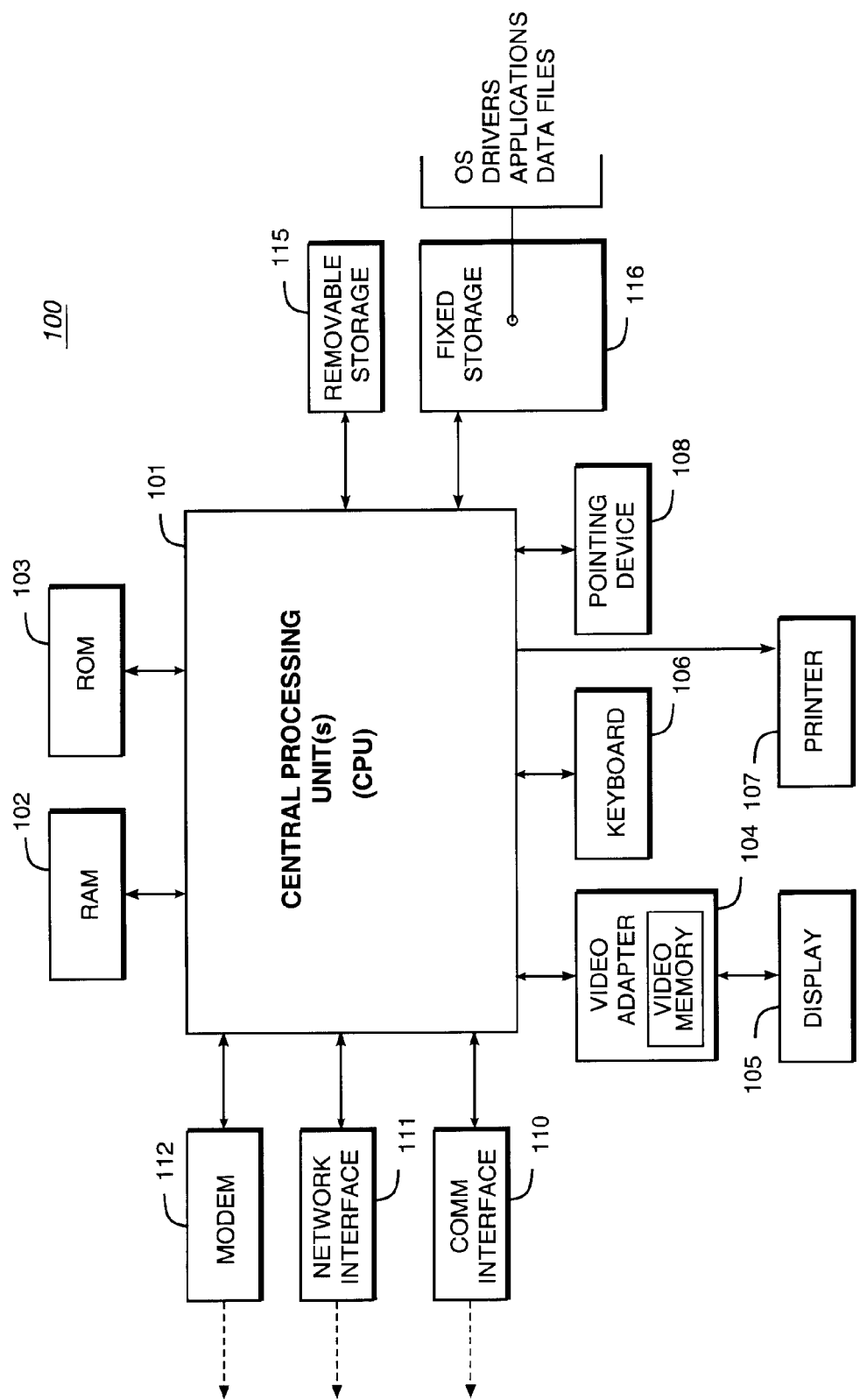
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include an RS-232 serial port, a Universal Serial Bus (USB) interface, or the like. Devices that will be commonly connected locally to the interface 10 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
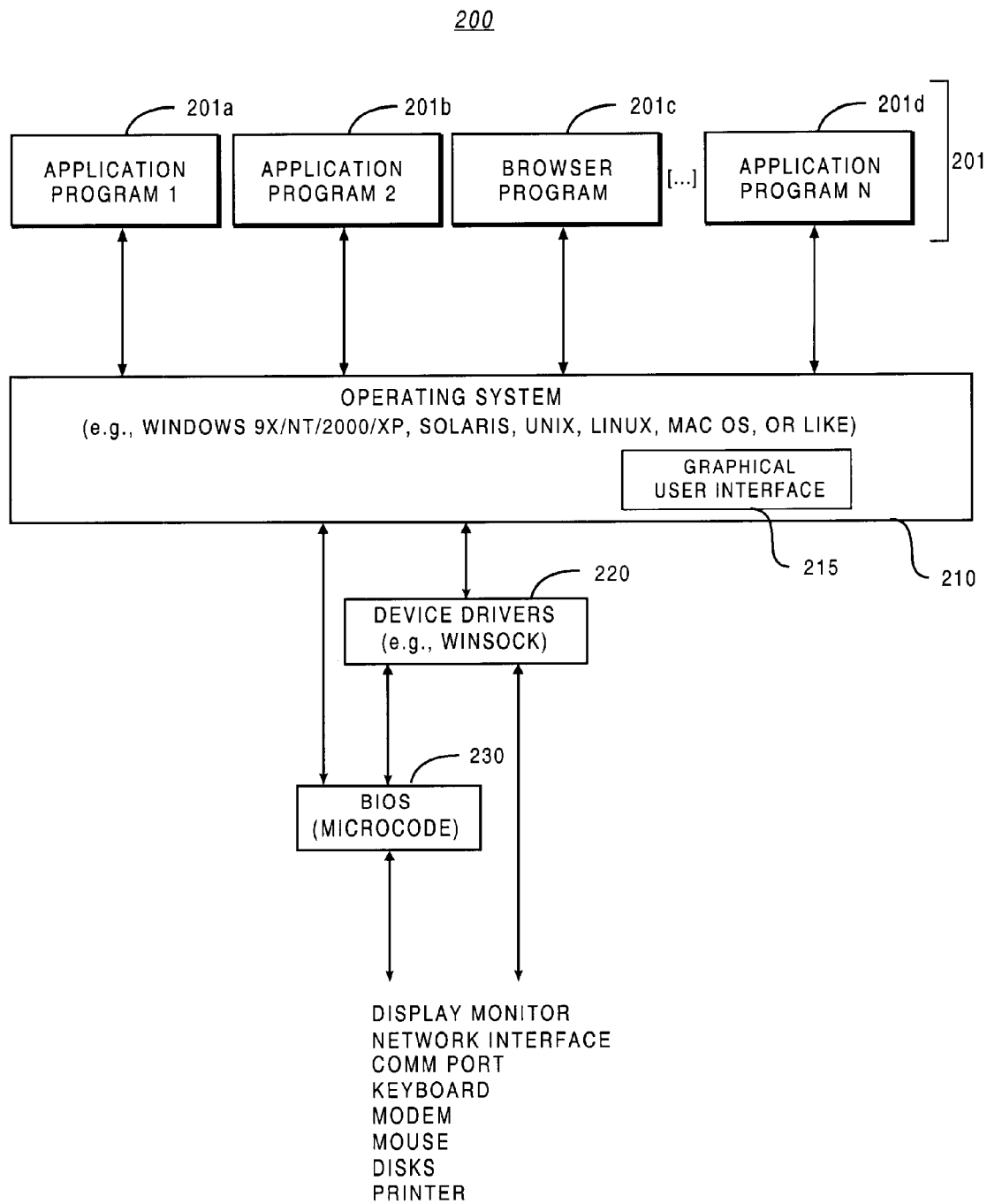
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*) may be "loaded" (i.e., transferred from fixed storage 116 into memory 102) for execution by the system 100.

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously mentioned operating systems.

C. Client/Server Database Management System

Figure 3:
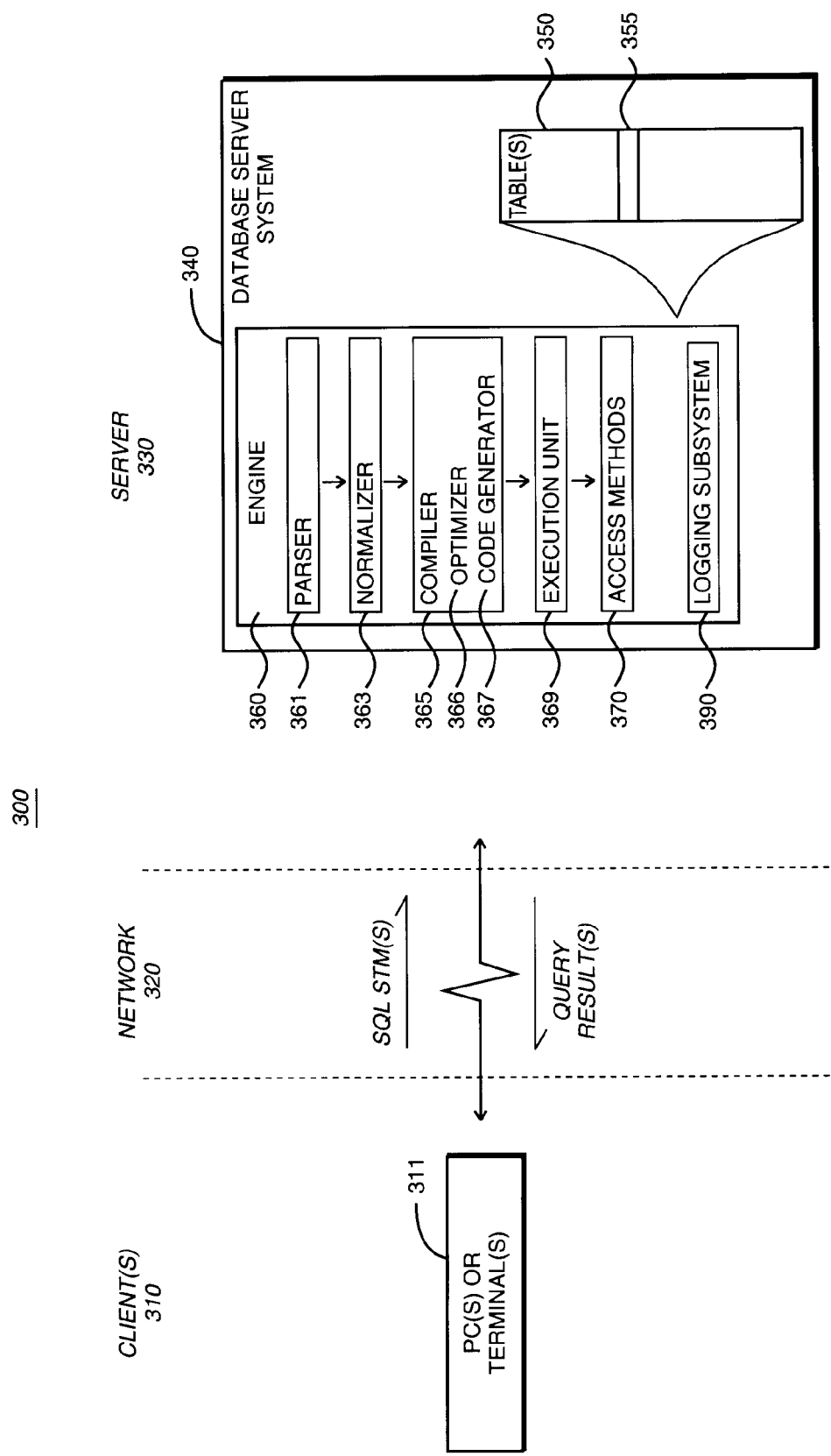
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone Workstations, dumb terminals, or the like, or comprise personal computers (PCs) such as the above-described system 100. Typically, such units would operate under a client operating system, such as Microsoft® Windows client operating system (e.g., Microsoft® Windows 95/98, Windows 2000, or Windows XP).

The database server system 340, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), or UNIX (Novell). The network 320 may be any one of a number of conventional network systems, including a Local Area Network (LAN) or Wide Area Network (WAN), as is known in the art (e.g., using Ethernet, IBM Token Ring, or the like). Network 320 includes functionality for packaging client calls in the well-known SQL (Structured Query Language) together with any parameter information into a format (of one or more packets) suitable for transmission across a cable or wire, for delivery to the database server system 340.

Client/server environments, database servers, and networks are well documented in the technical, trade, and patent literature. For a discussion of database servers and client/server environments generally, and Sybase architecture particularly, see, e.g., Nath, A., "The Guide to SQL Server," Second Edition, Addison-Wesley Publishing Company, 1995. For a description of Sybase® Adaptive Server® Enterprise, see, e.g., "Adaptive Server Enterprise 12.5 Product Documentation," available from Sybase, Inc. of Dublin, Calif. (and currently available via the Internet at http://sybooks.sybase.com/asg1250e.html). The disclosures of the foregoing are hereby incorporated by reference.

In operation, the client(s) 310 store data in, or retrieve data from, one or more database tables 350, as shown at FIG. 3. Typically resident on the server 330, each table itself comprises one or more rows or "records" (tuples) (e.g., row 355), each storing information arranged by columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the clients 310 issue one or more SQL commands to the server 330. SQL commands may specify, for instance, a query for retrieving particular data (i.e., data records meeting the query condition) from the database table(s) 350. The syntax of SQL (Structured Query Language) is well documented; see, e.g., the above-mentioned "An Introduction to Database Systems." In addition to retrieving the data from Database Server tables, the Clients also include the ability to insert new rows of data records into the table; Clients can also modify and/or delete existing records in the table(s).

In operation, the SQL statements received from the client(s) 310 (via network 320) are processed by engine 360 of the database server system 340. Engine 360 itself comprises parser 361, normalizer 363, compiler 365, execution unit 369, and access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer can also look-up any referential integrity constraints which exist and add those to the query.

After normalization, the query tree is passed to the compiler 365, which includes an optimizer 366 and a code generator 367. The optimizer is responsible for optimizing the query tree. The optimizer performs a cost-based analysis for formulating a query execution plan. The optimizer will, for instance, select the join order of tables (e.g., when working with more than one table); it will select relevant indexes (e.g., when indexes are available). The optimizer, therefore, performs an analysis of the query and picks the best execution plan, which in turn results in particular ones of the access methods being invoked during query execution.

As transactions are processed by the system, a logging system 390 is used to log changes which occur to the system. Each particular log record characterizes the change which has occurred to the database during processing of a transaction. This information can be used, for instance, in error recovery, to restore the database to a pre-existing, consistent state.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers such as the above-described system 100). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. Database System Providing Improved Methods for Transaction Logging

A. Introduction

1. Basic PLC Logging

Since the logging system is a shared resource in a multi-user database system, much contention exists for logging resources, as multiple users require access for performing transactions. At the same time, a database system must control access to the log to prevent one user from overwriting the results of another user.

The logging system of a DBMS (e.g., version 11.0 of Sybase Adaptive Server Enterprise (ASE)) typically includes at least two versions of the log: an in-memory version and a disk (or persistent) version. In version 11.0 of Sybase ASE, the in-memory version includes both a shared log cache and a private log cache that is employed to reduce steady state logging contention. The shared log cache exists as page chain in system memory. A plurality of private log caches (PLCs) buffer the log records in system memory instead of directly logging records into the log page chain (i.e., the shared log cache). When a task needs to either flush a private log cache or commit a transaction, the system flushes the log records from the task's private log cache to the shared log cache. At that instance, the task acquires the log semaphore controlling access to the shared log cache and copies all the log records from the private log cache into the shared log cache. Using this approach, each task accesses the shared log cache less frequently.

The shared log cache includes data pages storing log records that are linked together in memory to form a chain of pages. The shared log cache is written, at appropriate times, to disk for creating the disk version of the log. In typical operation, when a transaction "commits," the log records must first be flushed from the private log cache to the shared log cache. Typically, the log records must then also be written to disk before the database system proceeds with actually committing the transaction. "Write-ahead logging" is a general rule applied in database systems governing how a data page (buffer) and its corresponding log records are written to disk. Succinctly stated, the rule dictates that a data page cannot be written to disk until the log records describing the change to that page have been (previously) written to disk. A given transaction will even "sleep" while waiting for its log records to be written to disk. Therefore, the log records must go to disk before the data pages.

Figure 4:
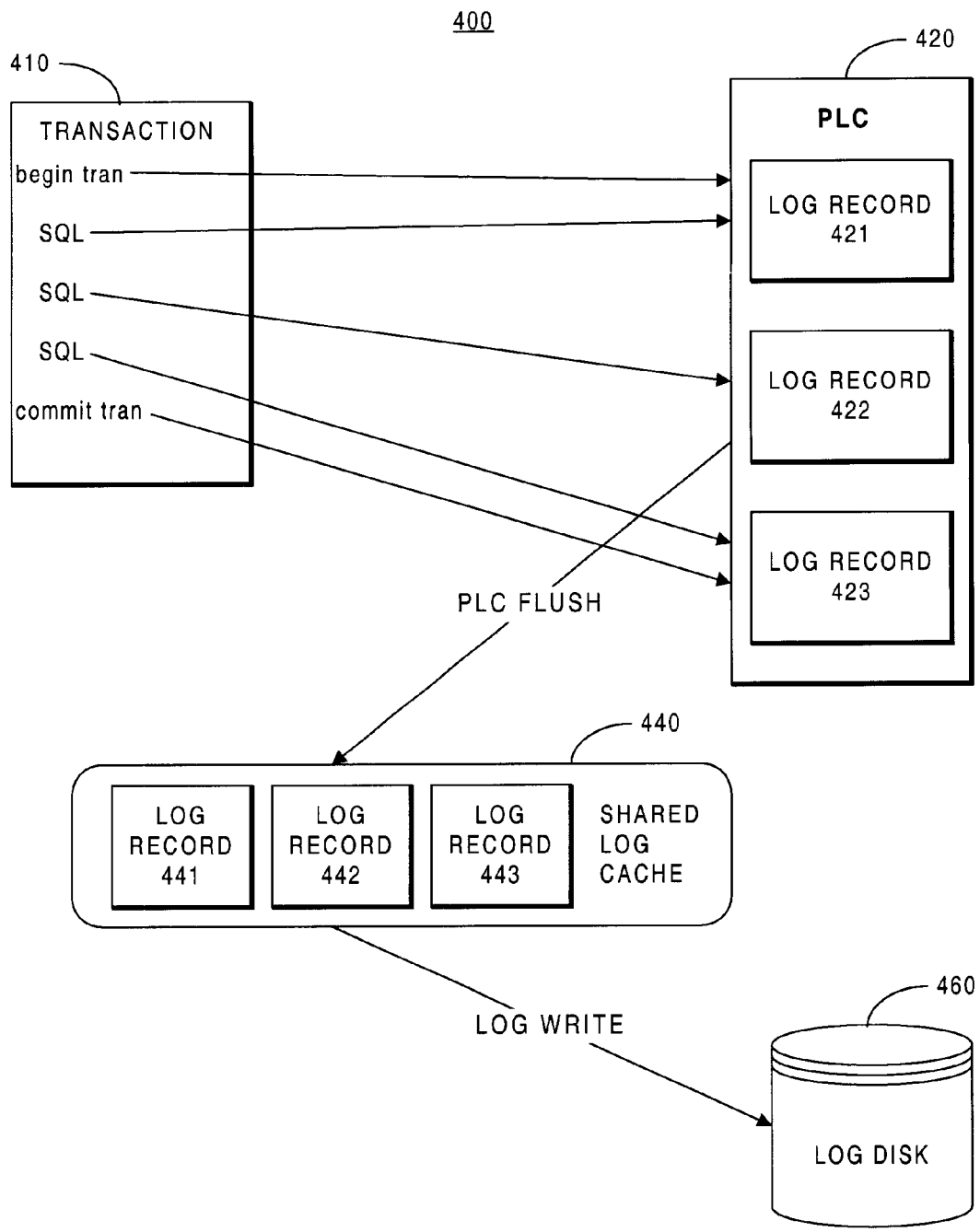
FIG. 4 is a diagram illustrating at a high level the logging operations involved in a typical transaction performed in a database management system.

FIG. 4 is a flow diagram 400 illustrating at a high level the logging operations involved in a typical transaction performed in a database management system (e.g., version 11.0 of Sybase ASE). As shown, a transaction 410 commences with a begin tran (begin transaction) statement. Each command or request (e.g., SQL command) generates a log record to its own private log cache 420. The private log cache 420 is a region of memory reserved for a particular database connection or "user." For instance, a transaction 410 writes log records 421, 422, 423 to the private log cache 420. At this point, none of these log records is written to the shared log cache.

When the transaction 410 is committed, two logging activities are generally triggered as a result. First, the log records 421, 422, 423 are written from the private log cache (PLC) 420 to a general or shared log cache 440 that is available to all users. This involves acquiring the log semaphore controlling access to the shared log cache 440 (so that no one else writes to such page), and flushing (or transferring) the log records 421, 422, 423 from the PLC 420 to the shared log cache 440. New log pages may also need to be allocated during this process of flushing a private log cache as hereinafter described. Next, the log records 441, 442, 443 in the shared log cache 440 are written to log disk 460 to persistently store such log records.

Both of the processes of flushing log pages or records from the PLC 420 to the shared log cache 440 and the writing of log records from the shared log cache 440 to log disk 460 involve sequential operations. As such, these operations may create a significant bottleneck on system performance, particularly in the context of a large OLTP system handling a large volume of transactions. Before examining the improved logging methods of the present invention, the following discussion will explain the operations currently involved in the PLC flushing and log writing processes as well as identify some of the problems addressed by the present invention.

2. Flushing of Private Log Cache to Shared Log Cache

Figure 5:
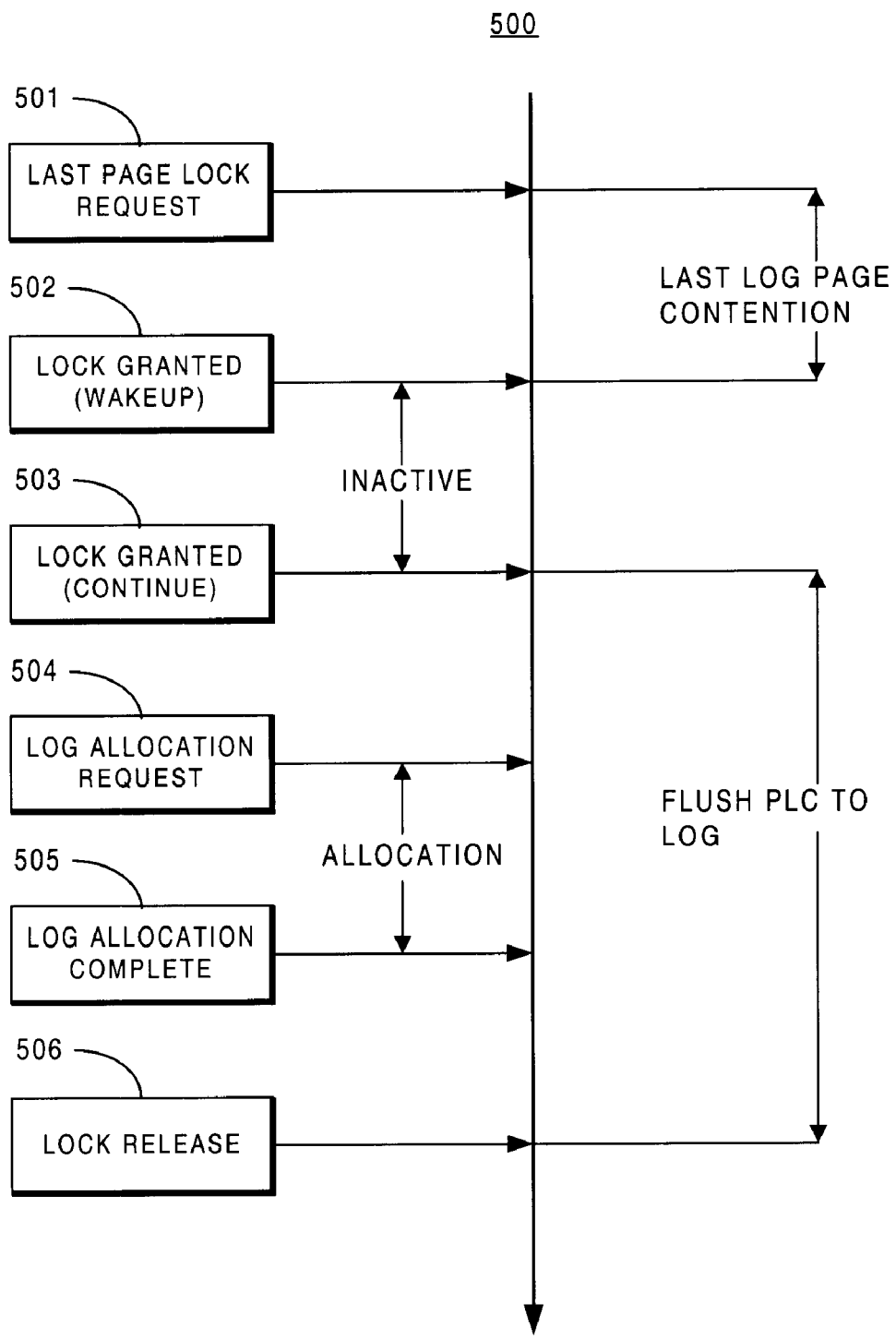
FIG. 5 is a flow diagram illustrating the steps involved in flushing a private log cache (PLC) to the shared log cache.

FIG. 5 is a flow diagram 500 illustrating at a high level the processes involved in flushing a private log cache (PLC) to the shared log cache. The processes involved in PLC flushing are in sequential order from the top to the bottom of FIG. 5. The process begins at block 501 with a request for acquisition of the log semaphore by a particular task. In many cases, multiple tasks may be waiting to acquire the log semaphore (which is also sometimes referred to as acquiring a lock on the last log page) at the same time in a system handling a large volume of transactions from a plurality of connections or users. In other words, multiple tasks may contend to acquire the log semaphore at the same time. During the time between the request for page lock and the granting of this request, another task may be flushing a PLC to the shared log cache. As a result, a given task may be delayed several times before it may commence as described in more detail below.

As shown at block 502, after a prior task releases the log semaphore, a wakeup call is issued to this particular task that has been waiting for acquisition of the log semaphore. After the wakeup call is issued, there is a period of inactivity before this particular task acquires the log semaphore and is permitted to continue with the logging operation. When the task is activated by the wakeup call, it is queued to the kernel so that the kernel may schedule the logging operation. Accordingly, this period of inactivity is variable as it depends upon other activities (e.g., tasks) being handled by the kernel. In some cases, acquisition of the log semaphore may be granted immediately. In other cases, it may be delayed as other tasks queued to the kernel. It should be noted that during this period of inactivity, not only this task, but also other subsequent tasks waiting to access the shared log cache may be delayed. Moreover, this delay is not because logging operations are actually being performed. Rather, both this particular task as well as subsequent tasks are blocked or delayed by a period of inactivity which may vary in length. This delay of the logging operation may cause a convoy effect causing a large wait time for subsequent tasks that are waiting to perform logging operations.

As shown at block 503, the request for acquisition of the log semaphore is granted by the kernel and this particular task is scheduled to run. The actual process of flushing log records from the PLC to the shared log cache may now commence. However, during this process, a new log page may be required. If a new log page is required, then as provided at block 504 an allocation request must be made to the page manager to request allocation of a new page. This allocation request may be a very expensive operation in terms of system performance. The request could potentially result in a global allocation map (GAM) search to locate available pages. Moreover, although log allocation may be required to complete flushing the PLC of this particular transaction to the shared log cache, it is not central to the user transaction. Although log page allocation is not a central part of a transaction, this log page allocation time may nonetheless cause a considerable delay in completion of a transaction as the log semaphore is held (and other tasks are blocked) while the page allocation request is pending. When the log allocation request is granted, a new log page is allocated as illustrated at block 505 and the log allocation process is complete. At this point, the process of flushing the PLC to the shared log cache may continue through completion. When the entire PLC has been flushed to the log cache, the logging operation is completed and the log semaphore is released as shown at block 506. At this point, the logging process may be repeated for a subsequent task.

It should be noted that if there are multiple tasks waiting to acquire the log semaphore, then all tasks other than the one granted a lock are typically delayed by the current task until it releases the log semaphore. Accordingly, both the period of inactivity before the log semaphore is acquired and the task is scheduled by the kernel (i.e., kernel latency) and the log page allocation period may not only delay completion of the current task or transaction, these periods also serve to delay subsequent transactions. For instance, if there are nine tasks that are waiting to acquire the log semaphore to flush log records, then the ninth thread will incur nine inactive periods due to kernel latency and possibly nine log page allocation delays as well. In other words, these delays propagate and result in considerable lower logging throughput and, therefore, corresponding delays in completing transactions. These delays are exacerbated by the log writing process which will now be described.

3. Writing Log Records to Log Disk

Once log records in the PLC are flushed to the shared log cache, these log records in the log buffers of the shared log cache need to be written to disk to be made persistent. Typically the log buffers containing log pages are in a list with an ascending order of "dirty" sequence numbers. When data is written to a log page or buffer, the "dirty" buffers containing log data are numbered in a specific sequence to ensure proper recovery in the event of a system crash. In the currently preferred embodiment, a sequence number (sometimes referred to as a "dirty sequence number") is issued as data is written to a log page or buffer. Prior to writing the shared log cache to disk, the dirty log buffers are arranged in a list with an ascending order of sequence numbers. For a task to complete and commit, it ensures that all log buffers in the sequence up to and including its commit page must be written to disk before a write operation or command can be issued on that commit page.

Figure 6:
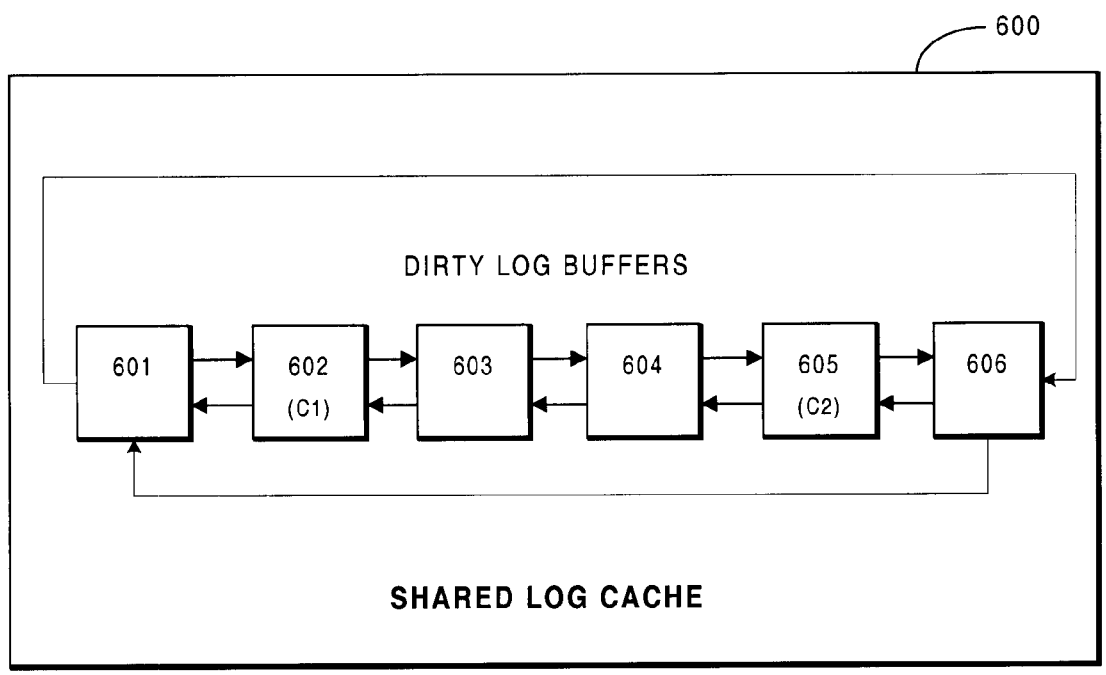
FIG. 6 illustrates at a high level an exemplary set of dirty log buffers in a shared log cache.

FIG. 6 illustrates at a high level an exemplary set of dirty log buffers in a shared log cache 600. As shown, dirty log buffers 601, 602, 603, 604, 605, 606 are arranged in a list with an ascending order of sequence numbers (e.g., sequence numbers from 601 to 606). For a particular task or transaction to commit, all of the log buffers in the sequence prior to the commit page (i.e., the page on which the commit record for a transaction is located) must be written to disk to ensure consistency. This includes not only log pages relating to this particular transaction, but also other pages in the shared log cache. The entire sequence or "dirty chain" of log buffers with sequence numbers less than or equal to the sequence number of the log page of the commit record is processed. This ensures that all of the pages prior to the current task are stored on disk in order to provide database consistency. Typically, this involves going through the dirty chain, acquiring "spin lock" from the cache manager on each of the log buffers in the dirty chain. A "spin lock" is a synchronization object that is used to synchronize access to data structures. A spin lock prevents a second process from accessing a data structure being used by a first process. After spin lock is acquired, a write command is issued on each of these buffers in sequence until reaching a buffer with a sequence numbers greater than the sequence number of the log page of its commit record. For instance, if the commit page (C1) for a first transaction is in log buffer 602, then buffers 601 and 602 must be written to log disk before this first transaction is completed. Similarly if the commit page for a second transaction (C2) is in buffer 605 as shown at FIG. 6, then buffers 601, 602, 603, and 604 are written to disk before 605. This transaction may not commit (i.e., conclude) until all of these buffers, from 601 through and including 605, have been written to disk.

Figure 7:
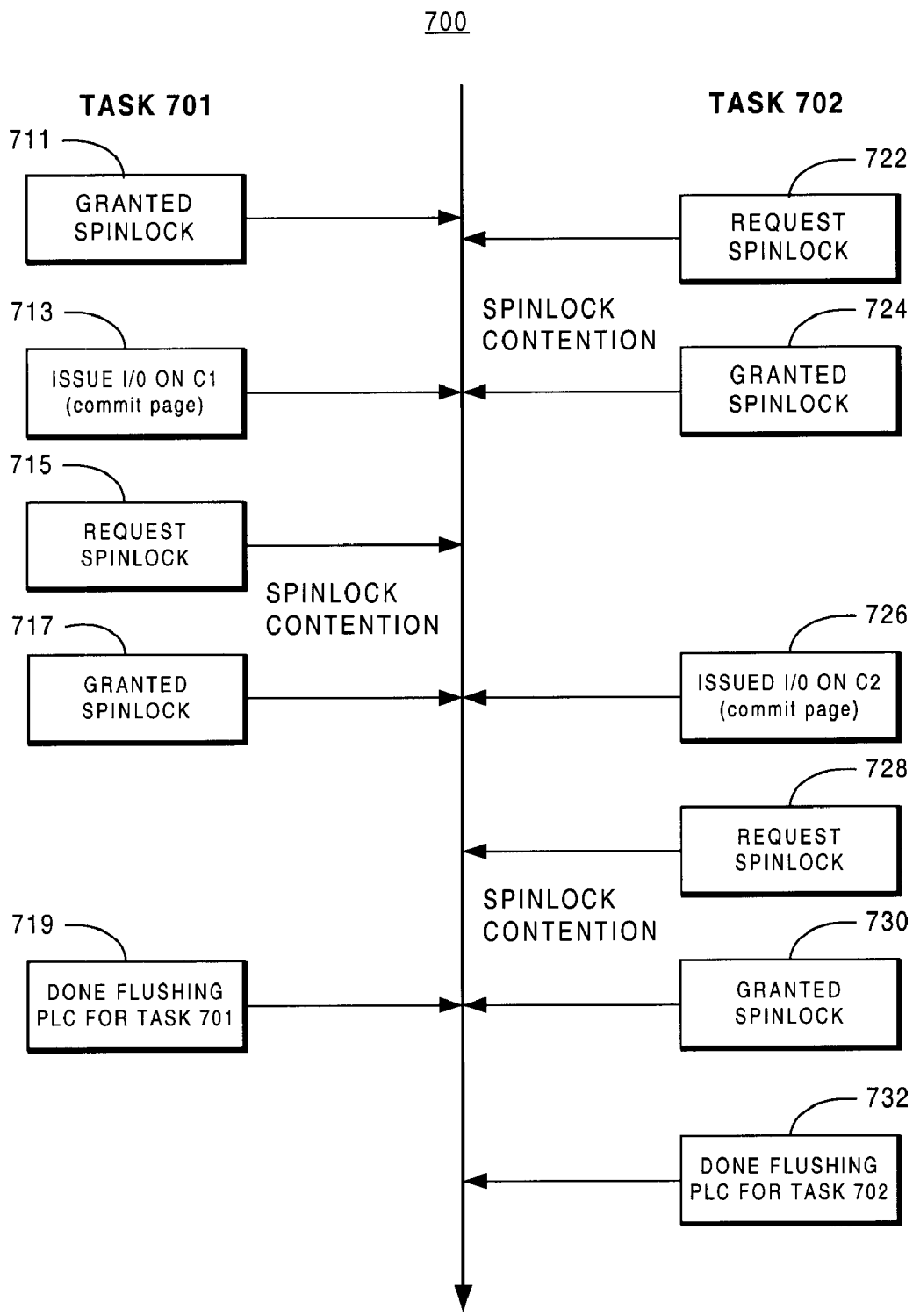
FIG. 7 illustrates an exemplary log writing process when two different tasks are attempting to write log pages in the shared log cache to disk.

Some of the issues involved in the log writing process may be illustrated by example. Consider, for instance, an exemplary log writing process when two different tasks are attempting to write log pages in the shared log cache to log disk. The chain of dirty log buffers or pages in the log cache is guarded by a cache manager. The cache manager controls access to buffers by issuing spin lock on these buffers, which blocks other tasks or threads from accessing these buffers until spin lock is released. As a result, the cache manager spin lock becomes a point of contention for completion of tasks by a database system that is processing transactions. FIG. 7 illustrates some of these problems involved in an exemplary log writing process 700 involving log writing operations by two different tasks. As shown, a first task (Task 701) is attempting to write log records of a first transaction and a second task (Task 702) is attempting to write log records of a second transaction. Assume that the commit record for Task 701 is at log page or buffer C1 (e.g., log buffer 602 as shown at FIG. 6) and the commit record for Task 702 is at page or buffer C2 (e.g., log buffer 605 as shown at FIG. 6). Below the headings Task 701 and Task 702 are an exemplary sequence of processes or operations performed by these two tasks in writing log records from the shared log cache to disk. These processes or operations are in sequential order from top to bottom and this sequence of operations will now be described.

Task 701 is first granted spin lock as shown at block 711 and Task 701 proceeds to write log records to the log disk and subsequently issues a write command on log buffer C1 at step 713. Spin lock is released after Task 701 has marked all of the log buffers (e.g., log buffers 601, 602 as shown at FIG. 6) to be written to the log disk as illustrated at block 713. While Task 701 is in process of marking log buffers to be written to disk, Task 702 requests spin lock as provided at block 722. However Task 702 is blocked and is not granted spin lock until after Task 701 releases spin lock (i.e., at block 713). At this point, Task 702 is granted spin lock as shown at block 724 and proceeds to walk through the log records prior to C2 (i.e., log records 601, 602, 603, 604, 605 as shown at FIG. 6) to enable task 702 to commit. However, log buffers 601, 602 have already been written (or marked for writing) to log disk by Task 701. Accordingly, as shown at block 726 task 702 issues a write command on the remaining log buffers prior to and including its commit page C2 (e.g., by writing log buffers 603, 604, 605 to log disk). Note that during this process, Task 702 walks through the entire "dirty chain" of pages prior to C2, including C1 (e.g., log buffer 602) and the log pages prior to C1 (e.g., log buffer 601) which were already written to disk by Task 701. Thus, Task 702 unnecessarily walks through pages that have already been processed while holding spin lock and blocking access by other tasks.

Meanwhile, Task 701 has again requested spin lock as illustrated at block 715 while Task 702 is still in process of walking through the dirty chain and marking the log pages to be written to disk. Accordingly, Task 701 is now blocked by Task 702. When Task 702 has completed marking log pages to be written to disk at block 726 and spin lock is released, Task 701 is granted spin lock as shown at block 717. Task 701 then proceeds to make sure that log page C1 and all prior pages (e.g., 601, 602 as shown at FIG. 6) have been successfully written to disk. When Task 701 verifies that all of these records have been written, then it can clear (or flush) these buffers and remove them from the dirty chain as illustrated at block 719. At this point, when Task 701 has completed clearing the buffers written to disk, spin lock is released. While these operations were in process, Task 702 has also again requested spin lock as shown at block 728. However Task 702 is delayed as spin lock is held by Task 701. As illustrated at block 730, spin lock is granted to Task 702 after Task 701 releases spin lock as shown at block 719. Task 702 can then proceed with the same process of verifying successful writing of the log records and flushing the buffers. After Task 702 has verified all records have been written and flushed the buffers, these logging operations terminate as shown at block 732.

As illustrated above, there are several operations in traditional database systems that cause delay and negatively impact transaction performance of such systems. First, there are too many tasks acquiring and releasing spin lock on the shared log cache. Acquiring and releasing spin lock is also a relatively expensive operation in terms of system performance. In addition, tasks or threads repeatedly visit the same log buffers. As described in the above example, Task 702 processed or walked through several of the same log buffers (e.g., log buffers C1 and prior buffers in the dirty chain) that had already been processed by Task 701. Consider this same logging process with a larger number of tasks as is typical with an OLTP database application. For instance, five tasks may be attempting to write log records to disk at the same time. By the time the fifth task acquires spin lock and walks through the dirty chain of log buffers, all of these buffers may already have been written to disk by the four prior tasks. The fifth task acquires spin lock blocking other tasks, only to find that all necessary work has already been performed. In this case, all that task five is doing is blocking subsequent tasks. In summary, these uncoordinated, individual logging operations are very inefficient, particularly in systems handling large transaction volumes.

In addition to the above-described inefficiencies in the PLC flushing and log writing operations, the two operations also contend with each other to some degree, thereby further compounding these problems. For example, when a task writing log records has acquired spin lock, this also delays the flushing of records from private log caches (PLCs) to the shared log cache. This is necessary so that the records are not flushed from a PLC to a log buffer in the shared log cache while this log cache is in process of being marked for writing to disk. As a result, the two operations compete with each other for access to the same resources (i.e., the shared log cache). For these reasons, cache manager spin lock becomes a bottleneck to system performance, particularly under heavy loads. This results in increased response time and lower transaction throughput.

In current database systems, particularly in the case of multiple CPU systems handling large transaction volumes, these logging operations become a bottleneck that slows system performance for the several reasons described above. In a multiple CPU environment handling a large volume of transactions, transaction throughput has been observed to be impacted by 90% or more based upon these delays in logging operations. The system and method of the present invention for addressing these problems will now be described.

B. Overview of Asynchronous Logging Service

The present invention comprises a system, which is referred to below as an "asynchronous logging service" or "ALS", which addresses these problems of contention for logging resources. The system of the present invention makes a database system more scalable, particularly in supporting large OLTP applications handling large transaction volumes on multi-processor machines. The asynchronous logging service or system eliminates the burden placed on individual user tasks of writing their own log records. Instead, the ALS provides independently executing threads to allocate log pages, to flush the private log cache (PLC) data to the shared log cache, and to write buffers in the shared log cache to log disk. This enables log contention to be removed almost completely, thereby improving transaction throughput by the database system.

The ALS provides improved methods for logging transactions. It addresses the problems of log semaphore contention resulting from random access to the shared log cache, non-determinable idle time due to kernel scheduling delays, delays resulting from piecemeal page allocation requests made on a transaction-by-transaction basis, and unnecessary and repetitive examination of log buffers in the shared log cache when writing data to disk. As described above, current database systems involve separately performing logging operations on a transaction-by-transaction basis. In other words, each transaction is not only responsible for the "front-office" tasks directly related to completing the transaction, but also for doing the "back-office" paperwork and clean-up tasks resulting from such transaction (i.e., the logging operations). The present invention provides a coordinated approach to systematically and centrally managing these logging operations, thereby reducing contention amongst various transactions for available logging resources and streamlining completion of these tasks.

C. Components and Operations of Asynchronous Logging Service

Figure 8:
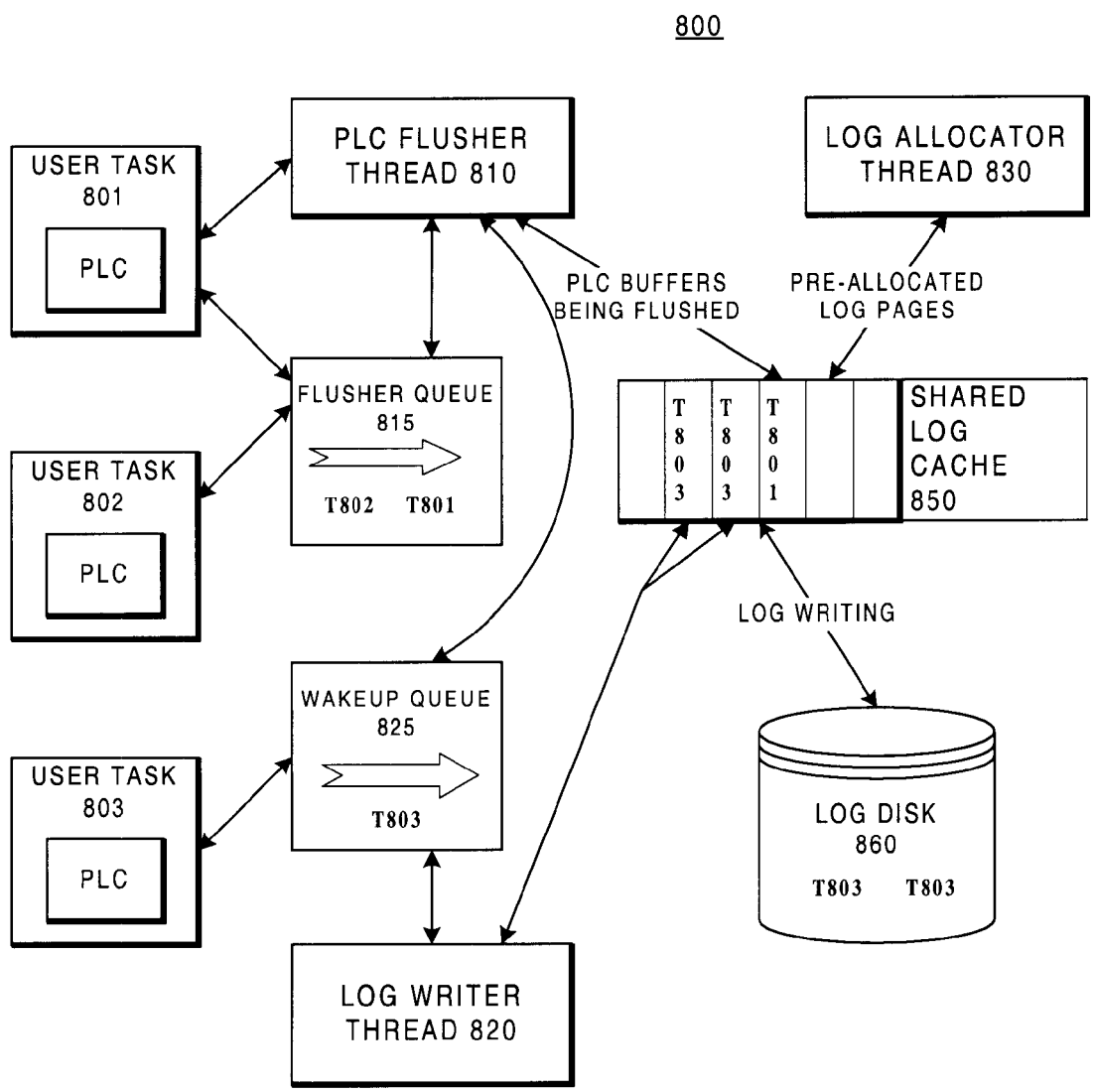
FIG. 8 is a high-level block diagram of an environment in which the asynchronous logging service of the present invention may be embodied.

The asynchronous logging service or system of the present invention performs several different roles that streamline the logging process. FIG. 8 is a high-level block diagram of an environment 800 in which the asynchronous logging service of the present invention may be embodied. As shown, environment 800 includes three user tasks 801, 802, 803, a PLC flusher module or thread 810, a log writer module or thread 820, a log allocator module or thread 830, a shared log cache 850, and a log disk 860. The PLC flusher thread 810 maintains a flusher queue 815 and the log writer thread 820 maintains a wakeup queue 825. The components of the ALS include the log allocator thread 830, the PLC flusher thread 810, and the log writer thread 820 which are dedicated to the tasks of allocating log pages, flushing private log caches (PLCs) to the shared log cache, and committing the shared log cache to the log disk, respectively. The operation of each of these components will now be described.

The log allocator module or thread 830 allocates log pages on a central basis. The log allocator thread 830 enables pages to be allocated in advance and outside the transaction boundary. As shown at FIG. 8, the log allocator thread 830 pre-allocates log pages to the shared log cache 850. Log pages are pre-allocated in blocks or groups, thereby avoiding lengthy delays in allocating pages on a piecemeal basis as such pages are required within particular transactions. The log allocator thread also continuously monitors the number of unused log pages. If the number of unused pages goes below a pre-selected threshold, the log allocator thread provides another set of log pages. The log allocator thread operates independently of the other service threads of the ALS.

The PLC flusher module or thread 810 may be invoked by a transaction or task to flush records from a PLC to the shared log cache on behalf of such task. The PLC flusher 810 operates on a flusher queue 815, which is implemented as part of the database structure in the currently preferred embodiment. When a task is ready to commit, the task places a flush request into the flusher queue 815 as illustrated at FIG. 8. The flush request includes a handle which enables the PLC flusher 810 to obtain access to PLC of the task submitting the request. The PLC flusher 810 continuously monitors the flusher queue 815, removing requests from the head of the queue and servicing them. As shown at FIG. 8, the PLC flusher 810 removes user task 801 from the flusher queue 815 and services this request by flushing PLC buffers from user task 801 to the shared log cache 850.

Use of the PLC flusher thread 810 reduces contention between user tasks for access to the shared log cache (i.e., acquisition of the log semaphore). Instead of multiple user tasks contending for access to the shared log cache, a single dedicated PLC flusher thread accesses the shared log cache to flush log records from multiple tasks in a coordinated fashion. This considerably reduces contention amongst user tasks for the log semaphore (i.e., access to the shared log cache). The PLC flusher thread 810 is usually continuously active and available for flushing log records to the shared log cache. In addition, the period of delay waiting for scheduling by the kernel (i.e., kernel latency) is minimized as the PLC flusher thread is a dedicated system task that has higher priority to system resources than an individual user task. Thus, the PLC flusher thread reduces contention on the log semaphore and enables log records to be more efficiently flushed from the PLC of a particular task to the shared log cache. Once it is done with flushing the PLC of a particular task, the PLC flusher thread queues the task's request to the wakeup queue 825 serviced by the log writer 820 as shown at FIG. 8. As shown, the PLC flusher has queued a request from user task 803 into the wakeup queue 825 after it has completed flushing the PLC buffers of user task 803.

The log writer module or thread 820 writes log records from the shared log cache to disk on behalf of a task or transaction. The log writer thread 820 continuously walks through the dirty buffer chain in the shared log cache. If it finds dirty buffers it writes them to disk. As shown at FIG. 8, the log writer issues a write command on the log pages of task 803 in the shared log cache. The log writer thread 820 avoids unnecessary traversal of the dirty chain of log pages or buffers in the shared log cache by individual transactions or tasks. The log writer also reduces contention on the spin lock as access to the shared log cache is coordinated centrally instead of providing for random access from multiple tasks (e.g., user tasks 801, 802, 803). Instead of several tasks contending for spin lock, access is limited to only the PLC flusher thread 810 and the log writer thread 820. The log writer thread 820 also takes advantage of the high bandwidth of the log device. Coordination of log writing through the log writer thread 820 allows write commands to be more efficiently issued in groups of larger blocks rather than sporadically in smaller segments. This allows write operations to be completed more quickly.

In addition, the log writer thread 820 also monitors the wakeup queue 825 to see if any task can be woken up. As previously described, after the PLC flusher 810 has flushed log records to the shared log cache 850 on behalf of a task (e.g., user task 803), it places a request into the wakeup queue 825 on behalf of the task. After log records (e.g., log records from user task 803) have been written to the log disk 860, the log writer thread 820 examines the wakeup queue 825 and wakes up a task if all the log buffers dirtied by that task have been written to disk. Since the log writer walks through the list of dirty buffers in the shared log cache, it knows which buffers are dirty and which have been written to disk. As shown at FIG. 8, user task 803 may be woken up by the log writer 820 as all of its log records have been written to the log disk 860. Once all of the above-described logging operations have been completed by the ALS on behalf of a user tasks, the user task or transaction may commit, thereby concluding the transaction.

The asynchronous logging service of the present invention is particularly useful in an OLTP environment with high transaction throughput requirements as logging operations of traditional database systems are typically a bottleneck to transaction throughput in OLTP environments. For example, a database system constructed in accordance with the present invention may be advantageously used on parallel processing machines with 16 or more processors that are supporting a large number of users. These environments typically involve large transaction volumes where there is a large volume of logging activity. The present invention reduces contention for logging resources and is particularly useful in reducing contention on the log semaphore. In addition, the present invention enables better utilization of logging devices with large I/O bandwidth compared with traditional database systems. In the currently preferred embodiment, the ALS may be switched on (i.e., activated) by a user when required. For example, a user may activate this service for a specific database that is handling an OLTP application on a 32-processor machine. However, there are certain situations where a user may elect not to use the ALS. For example, a decision support application (DSS) may be CPU-intensive, but have relatively few transactions and minimal logging requirements. In a system performing a reduced number of logging operations, a user may elect not to activate the service. If the ALS is enabled for a database system, the three threads or components of the ALS will be spawned whenever this database is utilized. The three component threads of the asynchronous logging service will now be described in greater detail.

D. Log Allocator

The log allocator thread continuously monitors the list of active databases and if a database is marked for the asynchronous logging service (i.e., a user has elected to use the service in conjunction with such database), then the following log_allocator_proc routine is invoked to determine if additional log pages should be allocated:

```
 1:  void CDECL
 2:  log_allocator_proc(FNIPARAM unused)
 3:  {
 4:      ... .
 5:      while (FOREVER)
 6:              {
 7:                      /*
 8:                      ** If yielded MAX_YIELDS without doing any useful
 9:                      ** work better to sleep.
10:                      */
11:                      if (Resource->rla_consecutive_yields > MAX_YIELDS)
12:                      {
13:                              /* Sleep till the alarm fires.... */
14:                      upsleepgeneric(..);
15:                      Resource->rla_consecutive_yields = 0;
16:                      }
17:                      else
18:                      {
19:                      /* Yield the CPU for other tasks */
20:                              (void) upyield*;
21:                      }
22:                      /* Assume that no work is going to be done... */
23:                         Resource->rla_consecutive_yields++;
24:
25:                         /* For all the async log enabled databases ,
26:                         ** pre-allocate log pages...
27:                         */
28:                         while (usenextactivedb(..) != INVALDBID)
29:                         {
30:                      /*
31:                              ** Skip those databases which are not Marked
32:                              ** .for log preallocation.
33:                              */
34:                              if (SKIP_LOG_PREALLOC(dbt))
35:                              {
36:                                continue;
37:                              }
38:
39:                              /* Open the sdes for syslogs. */
40:                              OPEN_SYSTEM_TABLE(SYSLOGS, dbt->dbt_dbid, dbt);
41:
42:                                 /* Get the log pre-allocation thread lock.*/
43:                                 LOCK_LOGALLOC_THREAD(dbt, &lockrec)
44:
45:                                 /* Allocate log buffers for the database. */
46:                              la_log_bp_prealloc(...):
47:
48:                              /* Release the fast log allocation thread lock. */
49:                                 UNLOCK_LOGALLOC_LOCK(lockrec);
50:                         }
51:              }
52:  }
```

The above log_allocator_proc( ) routine is the entry point for this system task and, as shown at line 5 above, it runs forever (i.e., continuously). At lines 8–15, if the thread does not find work for a certain number of iterations (MAX_YIELDS), then it goes to sleep and eventually will be woken up either after a pre-determined amount of time or in the event that the PLC flusher thread issues a wakeup call when it notices that number of pre-allocated log pages are below an established threshold. As illustrated above at lines 25–46, the log allocator thread pre-allocates a set number of log pages for databases that have activated the asynchronous logging service. The la_log_bp_prealloc( ) function at line 46 actually handles the pre-allocation of log pages for a database. The number of pages that are pre-allocated is based on the number of unused log pages.

The log allocator module also continuously evaluates the number of log pages utilized. If the number of log pages that are available falls below a pre-selected threshold, the log allocator automatically allocates a pre-determined number of additional log pages. Log pages are typically allocated in batches in the interests of efficiency. This enables the PLC flusher thread to use pre-allocated pages when a new page is required and avoids the delays involved in requesting each new page one by one. Delay in allocating new pages during the process of transferring (flushing) log records to the shared log cache is also minimized by the fact that the log allocator is a dedicated thread that is constantly active and generally has pages allocated and ready to use before they are required. The operations of the PLC flusher thread will now be described.

E. PLC Flusher

The PLC flusher module monitors a flush request queue. In the currently preferred embodiment, the flush request queue is in the database DBTABLE structure. When a user (transaction) thread is committing a transaction, the transaction thread places a flush request in this flush request queue. The flush request includes the information necessary to enable a private log cache (PLC) to be flushed to the shared log cache, such as the location of the PLC to be flushed. If the PLC flusher thread finds a request in the flusher queue, the PLC flusher thread performs the requested flushing and queues a wakeup request to the log writer thread. The following plcflusher_proc ( ) function performs these tasks:

```
1:   void CDECL
2:   plcflusher_proc(FNIPARAM unused)
3:   {
4:      ......
5:
6:      while (FOREVER)
7:      {
8:          /*
9:          ** If yielded MAX_YIELDS without doing any useful work,
10:         ** better to sleep.
11:         */
12:         if (yield_count > yield_limit)
13:         {
14:
15:             upsleepgeneric(..)
16:         );
17:         }
18:         else
19:         {   (void) upyield();
20:             yield_count++;
21:         }
22:
23:
24:
25:         while (usenextactivedb())
26:         {
27:             /* If database is not marked for ALS skip it */
28:             if (!ASYNC_LOG_ENABLED(dbt))
29:             {
30:                 continue;
31:             }
32:
33:
34:             P_SPINLOCK(FLUSHER_QUEUE)
35:             while (!EMPTYQUE(FLUSHER_QUEUE))
36:             {
37:                 als_request = REMQHEAD( );
38:
39:                 V_SPINLOCK(FLUSHER_QUEUE);
40:
41:                 yield_count = 0;
42:                 /* Lock the PLC for exclusive access */
43:                 LOCK_PLC(...);
44:
45:                 /* Do the flush */
46:                 plc_flush(...);
47:
48:                 /* Unlock the PLC */
49:                 UNLOCK_PLC(...);
50:
51:                 /* Now that we are done flushing, queue it for
52:                 ** log writer to issue wakeup
53:                 */
54:                 P_SPINLOCK(WAKEUP_QUEUE);
55:
56:                 INSQTAIL(WAKEUP_QUEUE, als_request);
57:
58:                 V_SPINLOCK(WAKEUP_QUEUE);
59:
60:
61:                 /*
62:                 ** If log writer is not sleeping then wake up.
63:                 */
64:                 if(LOG_WRITER_SLEEPING)
65:                 {
66:
67:                     upwakeup(log_writer);
68:                 }
69:
70:                 P_SPINLOCK(FLUSHER_QUEUE);
71:             }
72:             V_SPINLOCK(FLUSHER_QUEUE);
73:
74:         }
75:      }
76:   }
```

The PLC flusher thread loops though the active databases in the same manner as the log allocator thread. As shown at lines 25–31 above, if the PLC flusher thread finds that a database has not activated the asynchronous logging service, then it skips that database. If the database has activated the service, then a check is made to determine if any requests are in the flusher queue as illustrated at line 35. While the flusher queue is not empty, the requests in the queue are processed. Of particular interest, lines 42–49 contain the actual routine for flushing PLC log records to the shared log cache. At lines 42–43, a private log cache (PLC) is locked for exclusive access. Next, this PLC is flushed as shown at lines 45–46. After the flush is completed, the PLC is unlocked as provided at lines 48–49 and a request is placed in the wakeup queue as shown at lines 51–58. This queues a request for the log writer to issue a wakeup call to the transaction after the applicable log records have been written to disk. The following routine provides further explanation of this process.

When a user task is in the process of committing a transaction, the user task executes a finishlog( ) routine and calls a task named xls_preflush( ). The following xls_ preflush( ) task queues a request to the flusher queue and sleeps until it is woken up by the log writer thread.

```
1:   int
2:   xls_preflush(...)
3:   {
4:      ...
5:
6:           LOCK_PLC(plc);
7:           /*
8:           ** If this database is enabled for ALS and task can
9:           ** issue the ALS request then insert into the xxs
10:          ** queue and go to sleep
11:          */
12:
13:          if (ASYNC_LOG_CHECK(dbt, pss) )
14:          {
15:
16:                P_SPINLOCK(FLUSHER_QUEUE);
17:
18:                /* xxs to insert is */
19:                INSQTAIL(FLUSHER_QUEUE, als_request);
20:
21:                V_SPINLOCK(FLUSHER_QUEUE);
22:
23:
24:                UNLOCK_PLC(plc);
25:
26:                if(PLC_FLUSHER_SLEEPING)
27:                {
28:                     upwakeup(PLC_FLUSHER);
29:                }
30:
31:                /* Sleep until wokeup by log writer */
32:                upsleepgeneric( . . )
33:                /* At this point all the log pages are
34:                ** committed to the disk.
35:                */
36:
37:   }
```

As shown above, if a database is enabled for the asynchronous logging service, a user task can issue a request for logging services rather than having to directly handle the logging operations. As shown at lines 13–21, a user task may place a request into the flusher queue of the PLC flusher thread. If the PLC flusher thread is sleeping (i.e., inactive), a wakeup call is also issued as illustrated at lines 24–29. After a user task has placed the logging request into the flusher queue (and activated the PLC flusher thread if necessary), then the user task goes to sleep until woken up by the log writerthread after all records have been written to disk. At this point, the transaction may be completed.

The PLC flusher thread streamlines the process of flushing log records from the PLC to the shared log cache. The PLC flusher thread, which monitors the flush request queue, picks up requests from this queue, and performs the steps necessary to flush the PLC to the shared log cache. These steps are similar to those previously described and illustrated at FIG. 5, but with fewer delays due to kernel latency or log page allocation. Given that the PLC flusher thread is a system task that constantly monitors the flush request queue, the PLC flusher has higher priority than an individual user task, thereby substantially reducing the period of delay that is incurred waiting for scheduling by the kernel. Another advantage of using the PLC flusher thread is that use of this dedicated thread for flushing log records from the PLC to the shared log cache reduces or eliminates contention amongst user tasks for the log semaphore (i.e., access to the shared log cache). In addition, the PLC flusher thread uses log pages made available by the log allocation thread as previously described. When the PLC flusher thread has completed flushing the log records to the shared log cache, it wakes up (i.e., activates) the log writer thread to write these records to disk. In other words, when the PLC flusher is done flushing records to the shared log cache on behalf of a task, it hands the task over to the log writer to write the log records to disk as hereinafter described.

F. Log Writer

The log writer thread is very similar to PLC flusher thread except that it does not require any request from a user task for writing log records from the shared log cache to log disk. The log writer thread is a dedicated thread that continuously monitors the dirty chain (i.e., the log buffers in the shared log cache) and issues write commands as required. The log writer thread optimizes the issuance of write commands on log buffers in the dirty chain as it is a dedicated process and is not tied to any particular transaction. The log writer thread also tries to write log buffers to the log disk in batches when possible. While doing this job, it repeatedly checks to see if any tasks can be woken up and if so issues wakeup call to them. The following logwriter_proc routine is the entry point for the tasks performed by the log writer thread:

```
1:
2:   void CDECL
3:   logwriter_proc(FNIPARAM unused)
4:   {
5:      ...
6:      while (FOREVER)
7:      {
8:
9:           /*
10:          ** If yielded MAX_YIELDS without doing any useful work,
11:          ** better to sleep.
12:          */
13:          if (yield_count > yield_limit)
14:          {
15:               upsleepgeneric(...)
16:               yield_count = 0;
17:          }
18:          else
19:          {
20:               upyield( );
21:               yield_count++;
22:          }
23:
24:
25:
26:
27:          while (usenextactivedb(...) != INVALDBID)
28:          {
29:               /* Skip if ALS is disabled */
30:               if(!ASYNC_LOG_ENABLED(dbt) )
31:               {
32:                    continue;
33:               }
34:               /* Open the sdes for syslogs. */
35:
36:               OPEN_SYSTEM_TABLE(SYSLOGS, dbt->dbt_dbid,
                                      dbt);
37:
38:               /* Flush the dirtylog buffers */
39:               cm_writelogdes(logsdes->sdesp);
40:
41:               closetable(logsdes);
42:          }
43:      }
44:   }
```

As shown at line 6 above, the above thread runs continuously (FOREVER). At lines 10–17, if the thread does not find work for a certain number of iterations (MAX_YIELDS), then it goes to sleep until woken up. As with the PLC flusher and log allocator threads, a check is made at lines 29–33 to determine if the asynchronous logging service has been activated for a database. If the service has not been activated for a database, then that database is skipped. Of particular interest, at line 39 above, a call is made to the cm_writelogdes( ) function. The following cm_writelogdes( ) function is the workhorse routine that actually walks through the dirty chain and writes dirty buffers to the log disk:

```
1:
2:   void
3:   cm_writelogdes(struct des * desptr)
4:   {
5:
6:   ...
7:        /* Get the cache id of the log cache */
8:        cid = des_get_indcache(desptr, TABENTRY);
9:        /*
10:       ** We may have come here after a sleep or an yield. So let us
11:          ** if we can wakeup some tasks.
12:       */
13:       cm_wakeup_commit_tasks(desptr, cid);
14:
15:       /* Go through all the cachelets in the cache */
16:       for( count = 0; count < NUM_CACHELETS(cid); count++)
17:       {
18:            cdesc = Resource->rcaches[cid] [count+1];
19:            buf_spin = cdesc->cspin;
20:
21:            /* get the buffer manager spinlock */
22:            P_SPINLOCK(buf_spin);
23:
24:
25:            while (FOREVER)
26:            {
27:                 /* Get the first mass from the dirty chain */
28:
29:                 mass_ptr = desptr->dirty_chain[cid] [count]->dnew;
30:                 /*
31:                 ** Go through the dirty buffers writing out the ones
32:                 ** that can be written out and also identify a buffer
33:                 ** to wait for. In the case of the log descriptor,
34:                 ** we do everything possible to avoid writing the
35:                 ** last page of the log.
36:                 */
37:
38:                 do
39:                 {
40:                      /*
41:                      ** Make sure that buffers that we are walking
42:                      ** over are in increasing flush sequence number
43:                      ** order. This also means that this is the
44:                      ** last log page and some task or plc flusher
45:                      ** is in the process of filling it. So just
46:                      ** return and come back later.
47:                      */
48:                      if (MASS_STAT(mass_ptr) &
                         MASS_CHANGING)
49:                      {
50:                           we_should_return = TRUE;
51:                           break;
52:                      }
53:
54:                      else if (MASS_STAT(mass_ptr) &
                         MASS_WRITING)
55:                      {
56:                           /* buffer mass is in writing. Just skip*/
                              continue;
57:                      }
58:                      else
59:                      {
60:                           /*
61:                           ** Buffer is not being written, so
62:                      ** write it.
63:                           */
64:
65:                           /* Indicate that mass is in writing */
                              MASS_STAT(mass_ptr) |=
66:                                (MASS_WRITING |
                                   MASS_IO_NOT_STARTED);
67:
68:                           /* Note down the mass to in a queue */
69:                           write_queue[num_bufs] = mass_ptr;
70:                                     num_bufs++;
71:
72:
73:                      }
74:
75:                 /* If we have reached the end of the chain then
76:                 ** stop.
77:                 */
78:                 }
79:                 while ( ( (mass_ptr = MASS_DNEW(mass_ptr)) !=
80:                      (BUF *) desptr->dirty_chain[cid] [count] ) );
81:
82:
83:                 /* Go through the list of buffers and issue write
84:                 ** on them
85:                 */
86:                 for (cur_buf_num = 0; cur_buf_num < num_bufs;
87:                      cur_buf_num++)
88:                 {
89:                      cur_buf = write_queue[cur_buf_num];
90:                      /* Asynchronous write command */
91:                      (void) bufawrite(cur_buf, WAIT,
92:                                TRUE);
93:                 }
94:
95:                 if(we_should_return)
96:                 {
97:                      break;
98:                 }
99:
100:
101:           }    /* end of outer while */
102:
103:           V_SPINLOCK(buf_spin);
104:      }
105:
106:      /* Wakeup the tasks if possible */
107:      cm_wakeup_commit_tasks(desptr, cid);
108:
109:
110:  }
```

As shown at lines 7–9, the cache ID of the log cache is retrieved. The for loop commencing at line 16 proceeds to process all buffers (or cachelets) in the shared log cache. Next, at line 22, spin lock is obtained from the buffer (or cache) manager. Commencing with the while statement at line 25 and continuing through line 101, the routine goes through all of the dirty log buffers and writes them to the log disk. Several optimizations are included in the above function to avoid scanning the dirty chain when it is not necessary. Also at several key places the above function looks for tasks which can be woken up when all the log pages of those tasks are written to disk.

This routine for writing the dirty buffers starts by obtaining the first dirty buffer (or cachelet) as shown at line 29. Lines 41–52 illustrate one of the optimizations provided by this function. A check is made to ensure that the buffers to be written are in increasing flush sequence order. Also, if the page is the last log page it is skipped as some task or the PLC flusher thread is typically filling the page. Writing the last log page is avoided as much as possible so that it gets filled, thereby avoiding repeatedly writing partially filled pages. Next, at lines 54–56 a check is made to see if the buffer is being written. If the buffer is being written it is skipped. However if the buffer is in sequence and not being written, then it is placed into a queue for writing as shown at lines 61–73. After the end of the chain of dirty buffers has been reached, the buffers placed in the queue are written to disk as illustrated at lines 86–93.

At key places during the writing of log records to disk as illustrated in the above cm_writelogdes( ) function, the below cm_wakeup_commit_tasks( ) function is invoked to determine if any tasks can be woken up because all of the log records relating to such tasks have been written to disk. The cm_wakeup_commit_tasks( ) function may be invoked periodically when there are resources available during the process of writing log records to disk. For example, after one or more buffers have been written to disk, the cm_wakeup_commit_tasks( ) function may be called as illustrated above at line 107 to wakeup any tasks that were waiting for the log writing process. The following is the cm_wakeup_commit_tasks( ) function:

```
 1:
 2:  void
 3:  cm_wakeup_commit_tasks(struct des *desptr, cacheid_t cid)
 4:  {
 5:  flushseq = CIRCLE_INVAL;
 6:  ...
 7:       /* Note down the least sequence number */
 8:       for( count = 0; count < NUM_CACHELETS(cid); count++)
 9:       {
10:            cdesc = Resource->rcaches[cid] [count+1];
11:
12:            buf_spin = cdesc->cspin;
13:
14:            /* get the buffer manager spinlock */
15:            P_SPINLOCK(buf_spin);
16:
17:
18:       /* Head of the dirty chain */
19:            dchainhead = desptr->dirty_chain[cid] [count];
20:
21:            /* Let us record the first sequence number if
22:            ** it happens to be the least in all the
23:            ** chain.
24:            */
25:
26:            if( (dchainhead != dchainhead->dnew) &&
27:              ( (flushseq == CIRCLE_INVAL) ||
28:              CIRCLE_LT(MASS_FLUSHSEQ(dchainhead->dnew),
29:              flushseq) )
30:              )
31:            {
32:                flushseq = MASS_FLUSHSEQ(dchainhead->dnew);
33:            }
34:            V_SPINLOCK(buf_spin);
35:       }
36:  /* Get the spin lock on wakeup queue */
37:  P_SPINLOCK(WAKEUP_QUEUE);
38:
39:  /*
40:  ** Looks like we have some wakeup to issue. First collect all the
41:  ** tasks that are need to be woken up in a local queue
42:  */
43:  while(!EMPTYQUE(WAKEUP_QUEUE))
44:  {
45:    /* Get the next element from the queue */
46:        xxs = next_element(WAKEUP_QUEUE);
47:
48:    /* Get the sequence number of the commit page */
49:        massflush_seq = xxs->xxs_flushseq;
50:
51:    /* if the commit page sequence number is less than the
52:    ** least flush sequence number then wakeup the task.
53:    ** Remove the element from the queue.
54:    */
55:           if( (flushseq == CIRCLE_INVAL) ||
56:             (massflush_seq == CIRCLE_INVAL) ||
57:             CIRCLE_LT(massflush_seq, flushseq) )
58:        {
59:          /* Remove from the queue head */
60:              REMQHEAD(WAKEUP_QUEUE);
61:
62:             /* Issue wakeup to the task */
63:             upwakeup(...)
64:
65:        }
66:  else
67:  {
68:          /* We can break here because no need to go further */
69:          break
70:  }
71:  }
72:
73:  V_SPINLOCK(WAKEUP_QUEUE);
74:
75:  }
```

The cm_wakeup_commit_tasks( ) function finds the lowest (i.e., first) sequence number of all the dirty log buffers remaining in the cache as shown at lines 21–32. The function then walks through the list of tasks queued in the wakeup queue commencing at line 43 to determine if there are any tasks that can be woken up. The sequence number of the first dirty log page (i.e., the first page in the sequence that has not been written to disk) is compared to sequence number of the last log page (i.e., the log page containing the commit statement) of task(s) in the wakeup queue to determine if all log pages of such task(s) have been written to disk.

The log writer thread avoids the delays and processing overhead involved in having several tasks repeatedly walk through log buffers already written to disk by a prior transaction by tracking the sequence number of the log buffer at the head of the queue. If a particular task is earlier in the queue than a task already written to disk, then the log writer thread knows that these log buffers have already been written to disk and do not need to be reanalyzed. The log writer thread also monitors a wakeup queue to determine if any tasks can be woken up. A task can be woken up if all the log buffers in the sequence up to and including the log page or buffer on which the commit record is located have been written to disk. When the log writer determines that all such log buffers have been written to disk, the log writer wakes up (or reactivates) the corresponding task(s) that went to sleep after leaving a flush request with the PLC flusher thread.

G. Asynchronous Logging of Records

Figure 9:
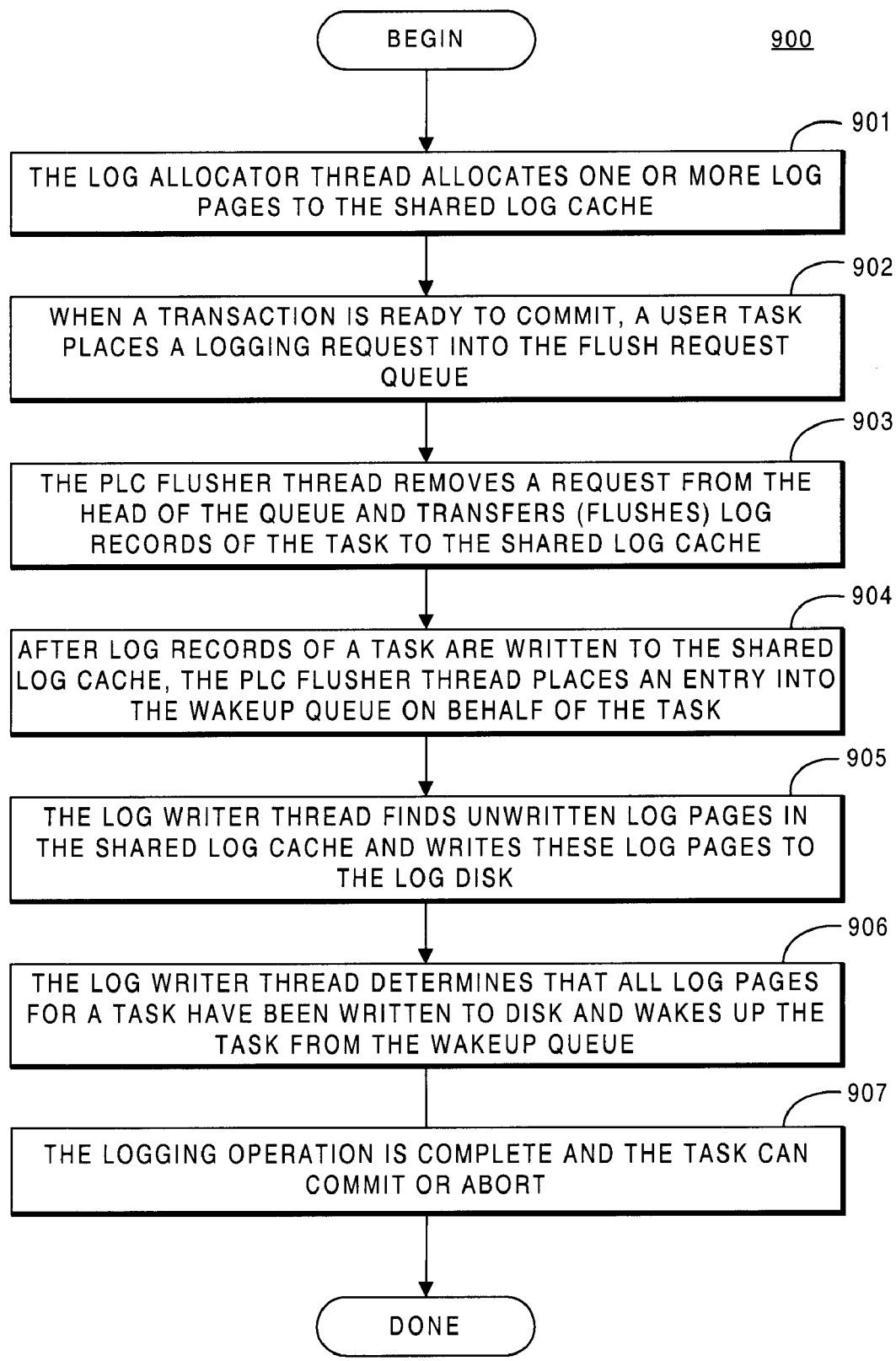
FIG. 9 comprises a single flowchart illustrating the detailed method steps of the operations of the system of the present invention in handling an exemplary logging request by a user task.

FIG. 9 comprises a single flowchart 900 illustrating the detailed method steps of the operations of the system of the present invention in handling an exemplary logging request by a user task (i.e., a transaction). For purposes of illustration, FIGS. 9A–B and the following discussion use as an example a sequence of operations for logging records relating to a single transaction or user task. However, given that the currently preferred embodiment of the system includes multiple threads, the following is only one example of the sequence of operations that may occur in the process of logging records of a given transaction. The sequence of operations that may occur in any particular instance may, in fact, differ from the below sequence. For example, log pages (or additional log pages) may be allocated by the log allocator thread either before or after a given user task or transaction places a request for logging services in the flush request queue. Accordingly, the following exemplary sequence of operations is for purposes of illustrating the operation of the present invention and not for limitation. The method steps described below may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

The method begins at step 901 with the allocation by the log allocator thread of one or more log pages to the shared log cache. The log allocator thread typically pre-allocates log pages in blocks or groups as previously described. The log allocator thread continuously monitors the number of unused log pages in the shared log cache and allocates pages when the number of unused pages is less than a pre-selected threshold. Accordingly, the allocation of log pages at step 901 may involve allocation of an initial set of log pages (e.g., upon starting up the system), or allocation of additional pages based upon the number of unused log pages available in the shared log cache.

At step 902, a user task, when it is about to commit a transaction, places a request for logging services into a flusher (or flush request) queue. The flusher queue is maintained and continuously monitored by the PLC flusher thread. A flush request placed by a user task into this queue includes a handle which enables the PLC flusher thread to obtain access to log records of the task submitting the request. In the currently preferred embodiment, this handle identifies log records that are maintained in a private log cache (PLC) as previously described. At step 903, the PLC flusher thread removes the request from the head of the flusher queue and services the request. The PLC flusher acquires (or retains) the log semaphore (i.e., exclusive access to the shared log cache) and uses the handle to locate and transfer (or flush) log records from the PLC to the shared log cache. During this process, the PLC flusher thread uses pre-allocated log pages made available by the log allocator thread. As noted above, if the number of available log pages drops below a certain threshold, the log allocator thread allocates additional pages to the shared log cache. The PLC flusher generally repeats these operations while any requests remain in the flusher queue. When no requests remain in the queue, the PLC flusher releases the log semaphore.

After the PLC flusher thread has flushed (i.e., transferred) log records from the task's PLC to the shared log cache, at step 904 the PLC flusher places an entry on behalf of the task into the wakeup queue maintained by the log writer thread. At step 905, the log writer thread writes log pages to the log disk. The log writer thread continuously monitors the shared log cache and writes log pages to disk when it finds dirty log pages or buffers (i.e., log pages not yet written to disk) in the shared log cache. The log writer includes optimizations to avoid unnecessary traversal of the dirty chain of log pages and to avoid repeatedly writing partially filled log pages in the shared log cache.

The log writer also tracks the sequence number of the first dirty log page (i.e., the first page in the sequence that has not been written to disk). Using this sequence number, the log writer can identify when a task in the wakeup queue should be activated. The log writer thread compares the sequence number of the last log page (i.e., the log page containing the commit statement for the task) of task(s) in the wakeup queue to the sequence number of the first dirty log page to determine if all log pages of such task(s) have been written to disk. After the log writer determines that all log pages of a particular task in the wakeup queue have been written to the log disk, at step 906 the log writer thread wakes up this task. At this point, the logging operations are complete. Accordingly, at step 907 the transaction may commit or abort.

While the invention is described in some detail with specific reference to a single preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system having a transaction log which is shared among multiple transactions, a method for storing log records describing changes occurring in a database in a manner that reduces contention among transactions for said transaction log, the method comprising:

creating log records describing changes to said database for a given transaction;

upon receiving for said given transaction a command which commits changes to said database, placing a request for storing log records of said given transaction in a request queue;

removing said request of said given transaction from said request queue and transferring said log records from said given transaction to a shared cache, said shared cache for storing log records from multiple transactions before said log records are written to said transaction log;

writing said log records from said shared cache to said transaction log; and committing any changes to said database made by said given transaction to said database after all log records for said given transaction have been written to said transaction log.

2. The method of claim 1, wherein said step of placing a request in a request queue includes associating said request with an identifier which enables identification of log records of said given transaction.

3. The method of claim 1, wherein said step of removing requests from said request queue includes removing requests in sequence based upon receipt of requests into said request queue.

4. The method of claim 1, wherein said step of removing requests from said request queue includes removing requests in sequence based upon a time each said request is placed in said request queue.

5. The method of claim 1, wherein said step of transferring log records from said given transaction to said shared cache includes using an independently executing thread for transferring said log records to said shared cache.

6. The method of claim 5, wherein said independently executing thread monitors said request queue and handles each request by transferring log records from said given transaction placing said request to said shared cache.

7. The method of claim 1, further comprising:

allocating in memory a private log cache for each given transaction, said private log cache for storing log records for a given transaction separately from log records of other transactions before transferring said log records to said shared cache.

8. The method of claim 1, wherein access to said shared cache is controlled through use of a log semaphore and said step of transferring log records from said given transaction to said shared cache includes controlling the log semaphore to obtain exclusive access to said shared cache.

9. The method of claim 1, wherein said step of writing said log records from said shared cache to said transaction log includes writing log pages containing said log records in sequence, said sequence based upon the sequence of log pages in said shared cache.

10. The method of claim 9, wherein said step of writing said log pages from said shared cache to said transaction log in sequence includes the substeps of:
   assigning a sequence number to each log page in said shared cache; and
   writing log pages from said shared cache to said transaction log based upon said sequence number of each said log page.

11. The method of claim 1, wherein said step of writing said log records from said shared cache to said transaction log includes using an independently executing thread for writing said log records to said transaction log.

12. The method of claim 1, wherein said step of writing said log records from said shared cache to said transaction log includes tracking log pages previously written to said transaction log to avoid traversing the same log page more than once.

13. The method of claim 1, wherein said step of writing said log records from said shared cache to said transaction log includes only writing log pages that are full, thereby avoiding writing log pages more than once.

14. The method of claim 1, wherein said step committing changes to said database from said given transaction includes the substeps of:
   determining a particular log page containing a log record of said command to commit changes to said database for said given transaction; and
   committing changes to said database made by said given transaction only after said particular log page is successfully written to said transaction log.

15. The method of claim 1, further comprising:
   allocating log pages to said shared cache independently of transactions.

16. The method of claim 15, wherein said step of allocating log pages to said shared cache includes using an independently executing thread for allocating log pages to said shared cache.

17. The method of claim 1, further comprising:
   allocating log pages to said shared cache when unused log pages in said shared cache are less than a pre-selected threshold.

18. The method of claim 17, wherein said step of allocating log pages to said shared cache includes using an independently executing thread for allocating log pages to said shared cache.

19. The method of claim 1, wherein said step of writing said log records from said shared cache to said transaction log includes monitoring said shared cache and writing log pages to said transaction log whenever log pages not yet written to said transaction log are found in said shared cache.

20. A computer-readable medium having computer-executable instructions for performing the method of claim 1.

21. A downloadable set of computer-executable instructions for performing the method of claim 1.

22. In a database system having a transaction log for writing log records of changes to a database from a plurality of transactions, a system for writing log records to said transaction log that reduces contention among said plurality of transactions, the system comprising:
   a private log cache for each transaction, said private log cache consisting of an area in memory set aside for storing log records which have been created to describe changes to said database for a given transaction but which have not yet been posted to said transaction log separately from log records of other transactions, so that each transaction is associated with its own private log cache;
   a flusher service that receives requests to write log records from said plurality of transactions and writes log records for a given transaction from a private log cache of said given transaction to a shared buffer, said shared buffer for storing log records from multiple transactions before said log records are written to said transaction log; and
   a log writer service that writes log records from said shared buffer to said transaction log.

23. The system of claim 22, wherein said flusher service is an independently executing thread.

24. The system of claim 22, wherein said log writer service is an independently executing thread.

25. The system of claim 22, wherein said flusher service includes a queue for receiving requests to write log records from said plurality of transactions.

26. The system of claim 25, wherein said flusher service writes log records for transactions in sequence, said sequence based upon receipt of requests in said queue.

27. The system of claim 25, wherein said flusher service monitors said queue and removes requests from said queue in sequence to avoid contention for said shared buffer among said plurality of transactions.

28. The system of claim 22, wherein said flusher service receives a request to write log records when a command to commit changes to said database is made by a given transaction.

29. The system of claim 22, further comprising:
   a log allocator service which monitors said shared buffer and allocates log pages to said shared buffer when necessary.

30. The system of claim 29, wherein said log allocator service pre-allocates log pages to said shared buffer.

31. The system of claim 29, wherein said log allocator service is an independently executing thread for allocating log pages to said shared buffer.

32. The system of claim 29, wherein said log allocator service allocates additional log pages to said shared buffer when unused log pages in said shared buffer are less than a pre-selected threshold.

33. The system of claim 22, wherein said flusher service retrieves log records from a private log cache of a given transaction by using a handle included with said request to write log records from said given transaction.

34. The system of claim 22, wherein said log writer service writes log pages from said shared buffer to said transaction log in sequence, said sequence based upon the sequence of log pages in said shared buffer.

35. The system of claim 22, wherein said log writer service assigns a sequence number to each log page in said shared buffer and writes log pages from said shared buffer to said transaction log based upon said sequence number of each said log page.

36. The system of claim 22, wherein said log writer service commits any changes to said database made by said given transaction to said database only after all log records in said shared buffer for said given transaction have been written to said transaction log.

37. The system of claim 22, wherein writing said log records to said transaction log includes writing said log records to disk.

38. In a database system having a transaction log which is shared among a plurality of transactions for writing log records of changes to at least one database, a method for said plurality of transactions to write log records to said transaction log, the method comprising:
   allocating in memory a private log cache for each transaction, said private log cache for storing log records for a given transaction separately from log records of other transactions before said log records are written to said transaction log;

creating log records describing changes to at least one database made by a given transaction and storing said log records in a private log cache for said given transaction;

upon receiving for said given transaction a command which commits changes to said at least one database, moving said log records from said private log cache to a log buffer, said log buffer for storing log records from multiple transactions before said log records are written to said transaction log;

writing said log records from said log buffer to said transaction log; and committing changes to said at least one database made by said given transaction after all log records for said given transaction have been written to said transaction log.

39. The method of claim 38, wherein said step of moving said log records from said private log cache to said log buffer includes the substeps of:

receiving a request for performing logging operations in a request queue, said request for logging operations including an identifier which enables identification of said private log cache of said given transaction;

removing requests from said request queue; and using said identifier to move log records from said private log cache to said log buffer.

40. The method of claim 38, wherein said substep of removing requests from said request queue includes removing requests in sequence, said sequence based upon receipt of requests into said request queue.

41. The method of claim 38, wherein said step of moving log records from said private log cache to said log buffer includes using an independently executing thread for moving said log records to said log buffer.

42. The method of claim 41, wherein said independently executing thread monitors said request queue and handles each given request by moving log records from said private log cache of said given transaction to said log buffer.

43. The method of claim 38, wherein access to said log buffer cache is controlled through use of a log semaphore and said step of moving log records from said private log cache to said log buffer includes controlling said log semaphore to obtain exclusive access to said log buffer.

44. The method of claim 38, wherein said step of writing said log records from said log buffer to said transaction log includes writing log pages containing said log records in sequence, said sequence based upon the sequence of log pages in said log buffer.

45. The method of claim 38, wherein said step of writing said log pages from said log buffer to said transaction log includes the substeps of:

assigning a sequence number to each log page in said log buffer; and writing log pages from said log buffer to said transaction log based upon said sequence number of each said log page.

46. The method of claim 38, wherein said step of writing said log records from said log buffer to said transaction log includes using an independently executing thread for writing said log records to said transaction log.

47. The method of claim 38, wherein said step of writing said log records from said log buffer to said transaction log includes tracking log pages in said log buffer written to said transaction log to avoid traversing the same log page more than once.

48. The method of claim 38, wherein said step of writing said log records from said log buffer to said transaction log includes only writing log pages that are full, thereby avoiding writing log pages more than once.

49. The method of claim 38, wherein said step committing changes to said at least one database made by said given transaction includes the substeps of:

determining a particular log page in said log buffer containing a log record of a command to commit changes to said at least one database made by said given transaction; and committing changes to said at least one database made by said given transaction only after said particular log page is successfully written to said transaction log.

50. The method of claim 38, further comprising:

allocating log pages to said log buffer in advance of receiving commands which commit changes to said at least one database.

51. The method of claim 50, wherein said step of allocating log pages to said log buffer includes using an independently executing thread for allocating log pages to said log buffer.

52. The method of claim 38, further comprising:

allocating additional log pages to said log buffer when unused log pages in said log buffer are less than a pre-selected threshold.

53. The method of claim 38, wherein said step of writing said log records from said log buffer to said transaction log includes automatically writing log pages to said transaction log whenever log pages not yet written to said transaction log are found in said log buffer.

54. The method of claim 38, wherein said step of writing said log records from said log buffer to said transaction log includes writing said log records to disk.

* * * * *